L. H. HANDY.
FLUID MIXER.
APPLICATION FILED NOV. 1, 1915.
1,200,609.
Patented Oct. 10, 1916.
2 SHEETS—SHEET 1.
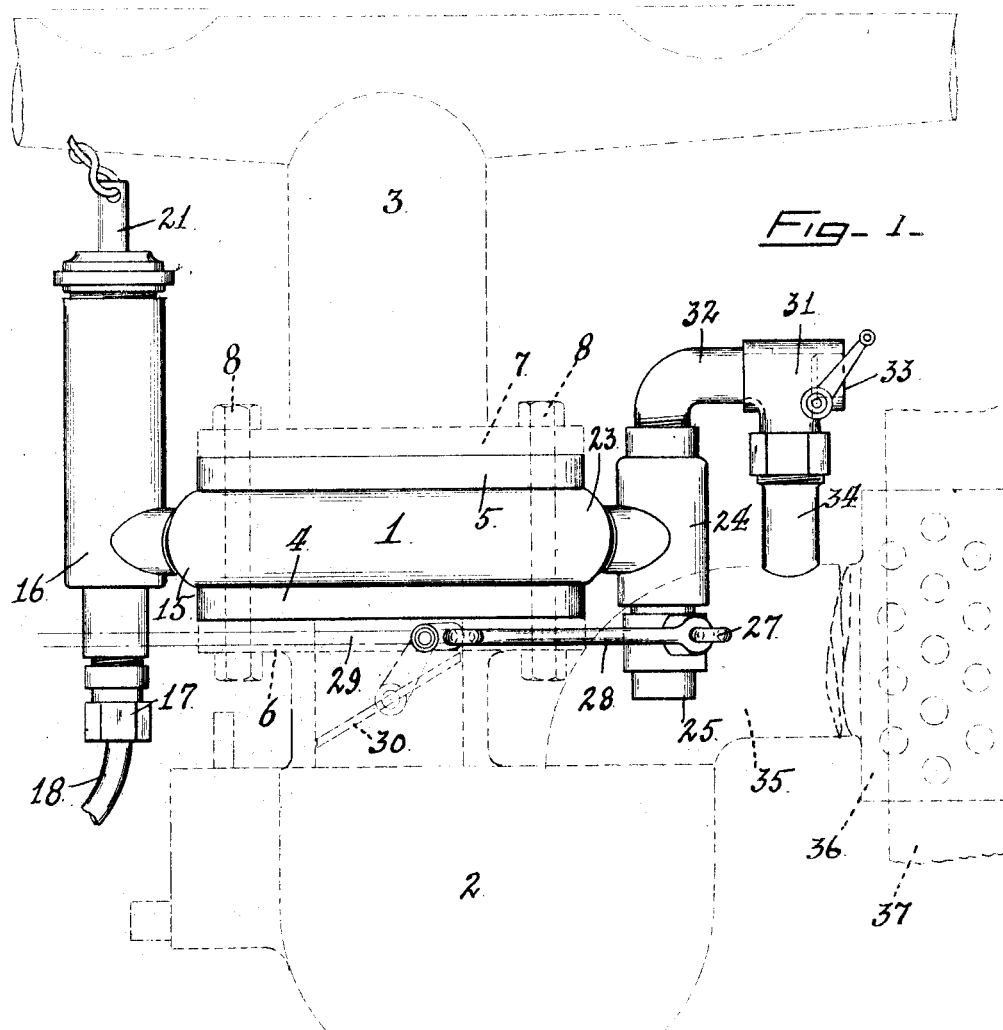
Fig-1-
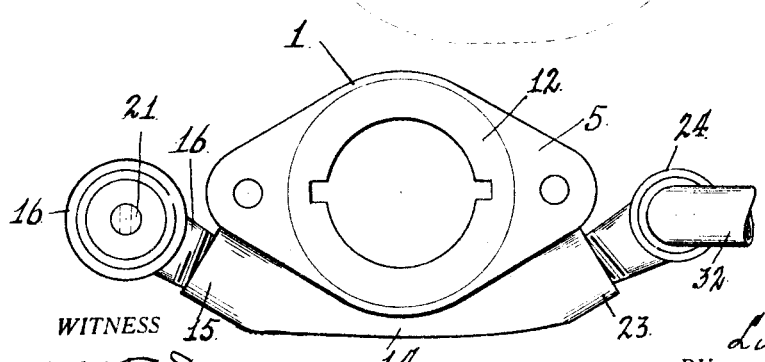
Fig-2-
WITNESS
Wm F Drew
INVENTOR.
Lucien H. Handy
BY
Wm F Booth
ATTORNEY

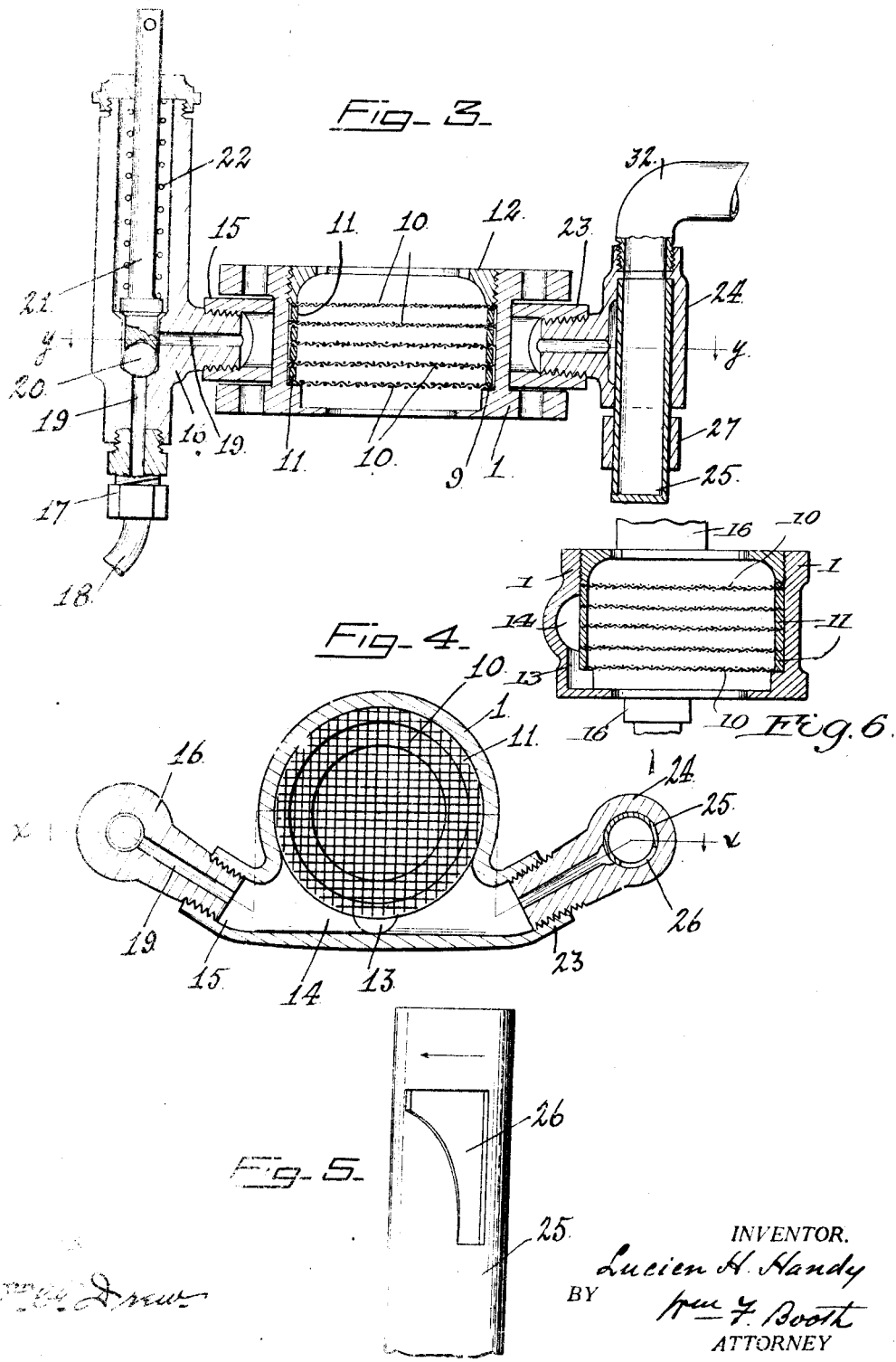

UNITED STATES PATENT OFFICE.

LUCIEN H. HANDY, OF OAKLAND, CALIFORNIA.

FLUID-MIXER.

1,200,609. Specification of Letters Patent. Patented Oct. 10, 1916.

Application filed November 1, 1915. Serial No. 58,969.

*To all whom it may concern:*

Be it known that I, LUCIEN H. HANDY, a citizen of the United States, residing at Oakland, in the county of Alameda and State of California, have invented certain new and useful Improvements in Fluid-Mixers for Internal-Combustion Engines, of which the following is a specification.

My invention relates to an auxiliary device for assisting the vaporization of the liquid fuel supplied to an internal combustion engine, and for altering the condition of the gaseous mixture formed subsequent to such vaporization.

It is well known that the vaporization of the liquid fuel effected by the usual type of carbureter is imperfect, and that considerable liquid fuel, in a more or less finely divided condition, is held in suspension by the gaseous mixture of carbureted air, and thus carried into the engine cylinder. This results in a substantial waste of fuel, and a consequent reduction in the efficiency of the engine. In fact, this loss of fuel is of such importance that numerous means have been employed for assisting the carbureter in its vaporizing function, and by such means the vaporization of the relatively more volatile hydrocarbons, such as commercial gasolene, is rendered more complete. The use, however, in variable speed engines, of the heavier fuels, such as kerosene and the petroleum product known as engine distillate, necessitates the employment of special devices to insure the proper vaporization of the fuel, and the proper mixing of the vapor thus formed with air, in order to provide a homogeneous gaseous fuel of the greatest possible efficiency.

The object of my invention, therefore, is to provide an auxiliary device which may be readily applied to the carbureter of an internal combustion engine, or at any point intermediate the carbureter and the engine cylinder, which vaporizes any liquid fuel held in suspension by the imperfectly carbureted air, and thoroughly mixes the gas so formed into a homogeneous fuel mixture, and which so controls the proportions of the component elements of said mixture, that a gaseous fuel of the greatest possible efficiency is supplied to the engine; the primary object of the device being to render practicable the use of liquid fuels of relatively low volatility. By the use of such fuels, which contain greater heat value per unit of weight, and which sell at a lower cost than the so-called higher grade fuels, the cost of operation of internal combustion engines may be materially reduced.

To this end my invention consists in the novel device which I shall hereinafter describe with reference to the accompanying drawings, in which—

Figure 1 is a side elevation of my device, illustrating the preferred method of application to the intake pipe of an internal combustion engine. Fig. 2 is a plan view of the device. Fig. 3 is a vertical section on the irregular line *x—x* of Fig. 4, viewed in the direction of the arrows. Fig. 4 is a horizontal section on the line *y—y* of Fig. 3, viewed in the direction of the arrows. Fig. 5 is an elevation, enlarged, of the tubular ported air controlling valve. Fig. 6 is a vertical sectional view of the shell 1, taken at right angles to the section of Fig. 3.

In the drawings, the numeral 1 represents a suitably constructed substantially cylindrical shell, shown in the present case as adapted to be inserted between a carbureter 2 of any of the usual types and the intake pipe 3 leading to the engine cylinders. In order to be so positioned, the shell 1 is formed with flanges 4 and 5, adapted to engage with the usual flanges 6 and 7 on the carbureter 2 and the intake pipe 3 respectively and to be held in gas-tight relation thereto by the bolts 8.

The cylindrical interior bore of the shell 1 is formed with a shoulder 9, upon which rests a series of screens 10, made preferably of a metallic wire gauze, and separated by the annular spacing rings 11. A clamping ring 12, screwed into the upper end of the interior bore of the shell 1, seats upon the uppermost of said screens and firmly clamps the entire series, with the intervening spacing rings 11, between said clamping ring 12 and the shoulder 9. The screens 10 are preferably formed with successively smaller meshes from the lowermost to the uppermost of said screens.

A vertical passage 13, Figs. 4 and 6 of the drawings, is formed in one side of the shell 1, opening at its lower end into the interior cylindrical bore of said shell below the lowermost of the screens 10, as seen in Fig. 6, and at its upper end communicating with a double ended horizontal passage 14. Into one end 15 of said passage 14 is screwed a T-headed fitting 16, Figs. 1, 2, 3 and 4, adapted to be coupled at 17 to a pipe 18 for supplying liquid fuel, and having a passage 19 therein for conveying the fuel into the horizontal passage 14 of the shell 1. A suitable valve, here shown as a ball valve 20, is seated by a plunger 21 and a spring 22 to normally cut off the supply of fuel. Suitable means, not shown in the drawings, are provided for opening said valve 20, at will, to admit liquid fuel to the interior of the shell 1 below the lowermost of the screens 10. At the other end 23 of the horizontal passage 14 is a T-headed fitting 24 containing a ported cylindrical valve 25, the port 26 of which is preferably formed as shown in Fig. 5 of the drawings to provide a rapidly increasing area as the valve is opened. A lever 27, Fig. 1, is connected by any convenient means, here shown as a link 28, to the operating rod 29 of the usual gas throttle valve 30, in such manner that both the throttle 30 and the ported valve 25 are opened and closed simultaneously. This ported valve 25 is for the purpose of controlling the admission of air to the interior of the shell 1 below the lowermost screen 10. The air thus admitted may or may not be previously treated, as by heating, moistening, mixing with steam, or otherwise. In the form illustrated, I have shown a three-way valve 31 in the pipe 32 leading to the ported control valve 25, and by means of said three-way valve 31 the air may be drawn from the atmosphere through the opening 33, or through the pipe 34 from the main air supply pipe 35, the air therein being pre-heated by passing through a jacket 36 surrounding the engine exhaust-pipe 37.

In the operation of my device, when the gaseous fuel mixture passes upward through the series of screens, any particles of liquid fuel held in suspension are broken up by impinging against the strands of said screens, and the mixture is thus rendered more homogeneous. Moreover, on account of the simultaneous operation of the ported air valve 25 with the fuel throttle valve 30, and the shape of the port 26 of said valve 25, more air is admitted thereby when the throttle valve is fully open than when the same is only partially open, and so the proportions of air and hydrocarbon vapor in the fuel mixture are maintained in correct relation.

The priming valve 20 is designed to be used by the operator, at will, to admit additional liquid fuel to the intake pipe, to provide a mixture rich in hydrocarbons, which is sometimes desirable, as for example in starting the engine when the same is cold, and vaporization of the liquid fuel is therefore relatively less complete than usual. If heavier fuels be used in the carbureter, the priming valve 20 may be used to admit a lighter and more readily vaporized fuel, such as gasolene, to assist in starting the engine when cold.

I have herein described and illustrated my device in its preferred form, and adapted to be connected in the preferred manner to an internal combustion engine of a well known type. It is obvious, however, that my device may be connected in other ways, and that its form may be changed in accordance therewith.

I claim:—

1. A device for the described purpose comprising a shell adapted for connection with a carbureter on one side and an engine intake pipe on the other, said shell having a substantially cylindrical bore therethrough, a separate transverse passage disposed perpendicularly to said bore, and a connecting passage between the central portion of said transverse passage and the end portion of said bore nearest said carbureter connection; a connection for admitting liquid fuel to said transverse passage; and a screen transversely disposed in said bore between the mouth of said connecting passage and the engine intake pipe connection.

2. A device for the described purpose comprising a shell adapted for connection with a carbureter on one side and an engine intake pipe on the other, said shell having a substantially cylindrical bore therethrough, a separate transverse passage disposed perpendicularly to said bore, and a longitudinal passage immediately exterior to the wall of said bore connecting the central portion of said transverse passage and the end portion of said bore nearest said carbureter connection; a connection for admitting air to said transverse passage; and a screen transversely disposed in said bore between the mouth of said connecting passage and the engine intake pipe connection.

3. A device for the described purpose comprising a shell adapted for connection with a carbureter on one side and an engine intake pipe on the other, said shell having a substantially cylindrical bore therethrough, a separate transverse passage disposed perpendicularly to said bore, and a connecting passage between the central portion of said transverse passage and the end portion of said bore nearest said carbureter connection; a connection for admitting liquid fuel to one end of said transverse passage; a connection for admitting air to the other end of said transverse passage; and a screen transversely disposed in said bore between the mouth of said connecting passage and the engine intake pipe connection.

4. A device for the described purpose comprising a shell adapted for connection with a carbureter on one side and an engine intake pipe on the other, said shell having a substantially cylindrical bore therethrough, a separate transverse passage disposed perpendicularly to said bore, and a connecting passage between the central portion of said transverse passage and the end portion of said bore nearest said carbureter connection; a valve-controlled connection for admitting liquid fuel to one end of said transverse passage; a valve-controlled connection for admitting air to the opposite end of said transverse passage; and a series of spaced transversely disposed screens within the bore of the shell between the mouth of said connecting passage and the engine intake pipe connection, the mesh of said screens decreasing in size successively from the carbureter end to the engine end of said bore.

5. A device for the described purpose comprising a shell adapted for connection with a carbureter on one side and an engine intake pipe on the other, said shell having a substantially cylindrical bore therethrough formed with an inwardly projecting annular shoulder near the carbureter end thereof and a longitudinal groove in the wall thereof, terminating between said shoulder and the carbureter end of the bore; and said shell being further provided with a transverse passage communicating at its central portion with said groove; a transversely disposed screen adapted to seat upon said annular shoulder within said bore; and an annular ring adapted to fit within said bore between said screen and the engine intake pipe connection, and forming a wall for said longitudinal groove to separate the same from said bore between said screen and said engine intake connection.

In testimony whereof I have signed my name to this specification in the presence of two subscribing witnesses.

LUCIEN H. HANDY.

Witnesses:
   WM. F. BOOTH,
   D. B. RICHARDS.